United States Patent [19]

Yamato et al.

[11] Patent Number: 5,651,817
[45] Date of Patent: Jul. 29, 1997

[54] CEMENT DISPERSANT

[75] Inventors: Fuzio Yamato; Haruyuki Satoh, both of Wakayama, Japan

[73] Assignee: Kao Corporation, Tokyo, Japan

[21] Appl. No.: 572,609

[22] Filed: Dec. 14, 1995

[51] Int. Cl.$^6$ .......................... C04B 24/04; C04B 24/20; C04B 24/22
[52] U.S. Cl. .......................... 106/809; 106/802; 106/810; 106/823; 524/2; 524/3; 524/5; 524/6; 524/650; 528/127; 528/129; 528/150; 528/158; 528/161; 528/227; 528/230; 528/265; 528/364
[58] Field of Search .......................... 106/802, 809, 106/810, 823, 724, 725, 728; 524/2, 3, 6, 650, 593, 594, 595, 599, 5; 528/125, 127, 129, 161, 230, 265, 150, 158, 227, 364

[56] References Cited

U.S. PATENT DOCUMENTS

| 3,788,868 | 1/1974 | Kitsuda et al. | 106/809 |
|---|---|---|---|
| 4,239,550 | 12/1980 | Kohler | 106/809 |
| 4,391,645 | 7/1983 | Marcellis et al. | 106/809 |
| 4,441,929 | 4/1984 | Marcellis et al. | 106/809 |
| 4,457,874 | 7/1984 | Papalos et al. | 106/809 |
| 4,759,802 | 7/1988 | Ochi et al. | 106/809 |
| 5,092,934 | 3/1992 | Furuhashi et al. | 106/809 |
| 5,105,885 | 4/1992 | Bray et al. | 166/293 |
| 5,245,001 | 9/1993 | Furuhashi et al. | 106/809 |
| 5,348,582 | 9/1994 | Herzig et al. | 106/809 |

FOREIGN PATENT DOCUMENTS

| 6-293542 | 10/1994 | Japan . |
|---|---|---|
| 6-340459 | 12/1994 | Japan . |
| WO95/16643 | 6/1995 | WIPO . |

OTHER PUBLICATIONS

Database WPI, Derwent Publications Ltd., London, GB; Abstract No. 96-112474 (Jan. 16, 1996).
Database WPI, Derwent Publications Ltd., London, GB; Abstract No. 95-063721 (Dec. 13, 1994).
Database WPI, Derwent Publications Ltd., London, GB; Abstract No. 86-269470 (Sep. 1, 1986).
Database WPI, Derwent Publications Ltd., London, GB; Abstract No. 95-009459 (Oct. 21, 1994).
Database WPI, Derwent Publications Ltd., London, GB; Abstract No. 85-258546 (Aug. 23, 1985).
Database WPI, Derwent Publications Ltd., London, GB; Abstract No. 85-053729 (Jan. 21, 1985).
Database WPI, Derwent Publications Ltd., London, GB; Abstract No. 87-046219 (Jan. 9, 1987).

*Primary Examiner*—Michael Marcheschi
*Attorney, Agent, or Firm*—Birch, Stewart, Kolasch & Birch, LLP

[57] ABSTRACT

When a cement dispersant comprising a polymer which is obtained by co-condensating monomers comprising monomer (A) and monomer (B) with formaldehyde, or a salt obtained by neutralizing the polymer, wherein the monomer (A) is an aromatic compound having, on the average, 1 to 300 mol per molecule of at least one member selected from the group consisting of oxyethylene group and oxypropylene group, and the monomer (B) is an aromatic compound having a carboxyl group; or another cement dispersant comprising a polymer which is obtained by co-condensating monomers comprising the above-described monomer (A), the above-described monomer (B) and monomer (C) which is an aromatic compound having a sulfonic acid group with formaldehyde, or a salt obtained by neutralizing the polymer is used as one component of a hydraulic composition, the fluidity of the hydraulic composition is maintained for a long time. Therefore, no trouble on transportation is caused during the force feeding of the hydraulic composition with a pump.

24 Claims, No Drawings

CEMENT DISPERSANT

BACKGROUND OF INVENTION

1. Field of the Invention

The present invention relates to a cement dispersant. More particularly, the present invention relates to a cement dispersant which can impart a proper fluidity to a hydraulic composition such as cement paste, mortar and concrete, and has an excellent effect on the retention of fluidity of the composition.

2. Description of the Related Art

Examples of cement dispersants which have hitherto be used for the purpose of improving the fluidity of a hydraulic composition include salts of naphthalenesulfonic acid/ formaldehyde condensates (hereinafter referred to as "the naphthalene compounds"), salts of melaminesulfonic acid/ formaldehyde condensates (hereinafter referred to as "the melamine compounds"), and salts of polycarboxylic acids (hereinafter referred to as "the polycarboxylic acid compounds").

Each of these cement dispersants has a problem, though each has an excellent characteristic. For example, the polycarboxylic acid compounds have the problem of significantly retarding the hardening of a hydraulic composition such as concrete while exhibiting an excellent dispersibility. On the other hand, the naphthalene compounds and the melamine compounds are excellent in dispersibility, and hydraulic compositions each comprising one of these compounds are excellent in hardening characteristics. However, such hydraulic compositions have such a problem that they exhibit a large slump loss (i.e., an elapsing reduction in fluidity).

Thus, compounds satisfying all properties required in cement dispersants have not yet been found, and the existing situation is that conventional cement dispersants involve some problems.

DISCLOSURE OF THE INVENTION

Summary of the Invention

In view of the situation described above, the present inventors have made extensive studies in order to develop a cement dispersant satisfying all properties required therein. That is, they have clarified the properties of hydraulic compositions containing various surfactants including cement dispersants and investigated the dispersing mechanisms of such surfactants, considering the steric hindrance of the surfactants to adhesions among particles such as cement and the adsorbing properties of the surfactants to, e.g., cement. Based on the results of the studies, the present inventors have designed the chemical structure of a cement dispersant and have accomplished a cement dispersant having such characteristics that it is excellent in dispersing property and the effect on the retention of fluidity of a hydraulic composition and that the hydraulic composition is less retarded in hardening thereof, which combined properties have not been obtained with existing cement dispersants.

Thus, the present invention relates to a cement dispersant comprising or consisting essentially of a polymer which is obtained by co-condensating monomers comprising or consisting essentially of monomer (A) and monomer (B) with formaldehyde, or a salt obtained by neutralizing the polymer, wherein the monomer (A) is an aromatic compound having, on the average, 1 to 300 mol per molecule of at least one member selected from the group consisting of oxyethylene group and oxypropylene group, and the monomer (B) is an aromatic compound having a carboxyl group.

Further, the present invention relates to a cement dispersant comprising or consisting essentially of a polymer which is obtained by co-condensating monomers comprising or consisting essentially of monomer (A), monomer (B) and monomer (C) with formaldehyde, or a salt obtained by neutralizing the polymer, wherein the monomer (A) is an aromatic compound having, on the average, 1 to 300 mol per molecule of at least one member selected from the group consisting of oxyethylene group and oxypropylene group, the monomer (B) is an aromatic compound having a carboxyl group and the monomer (C) is an aromatic compound having a sulfonic acid group.

The polymer as a constituent of the above cement dispersant is a produced polymer mixture obtained by co-condensation described above.

The "monomers consisting essentially of monomer (A) and monomer (B)" and "monomers consisting essentially of monomer (A), monomer (B) and monomer (C)" herein mean that the monomers may contain a monomer other than indispensable monomers and condensable with formaldehyde, in addition to indispensable monomers [i.e., monomers (A) and (C), or monomers (A), (B) and (C)]. However, the monomer other than indispensable monomers is used in a limited amount.

Furthermore, the present invention relates to a hydraulic composition comprising any of the above-described cement dispersants and cement.

The "hydraulic composition" herein includes both a mixture containing the cement dispersant according to the present invention and cement as the indispensable components and, if necessary, an aggregate, an additive, an admixture and the like, while not containing water; and another mixture containing water in addition to those described above which is called as cement paste, mortar or concrete.

In addition, the present invention relates to a use of a polymer which is obtained by co-condensating monomers comprising or consisting essentially of monomer (A) and monomer (B) with formaldehyde or a salt obtained by neutralizing the polymer for mixing it with cement, wherein the monomer (A) is an aromatic compound having, on the average, 1 to 300 mol per molecule of at least one member selected from the group consisting of oxyethylene group and oxypropylene group, and the monomer (B) is an aromatic compound having a carboxyl group; and a use of a polymer which is obtained by co-condensating monomers comprising or consisting essentially of monomer (A), monomer (B) and monomer (C) with formaldehyde or a salt obtained by neutralizing the polymer for mixing it with cement, wherein the monomer (A) is an aromatic compound having, on the average, 1 to 800 mol per molecule of at least one member selected from the group consisting of oxyethylene group and oxypropylene group, the monomer (B) is an aromatic compound having a carboxyl group and the monomer (C) is an aromatic compound having a sulfonic acid group.

The present invention relates to a method of dispersing a cement in a hydraulic composition, comprising mixing a polymer, which is obtained by co-condensating monomers comprising or consisting essentially of monomer (A) and monomer (B) with formaldehyde, or a salt obtained by neutralizing the polymer, with cement, wherein the monomer (A) is an aromatic compound having, on the average, 1 to 800 mol per molecule of at least one member selected from the group consisting of oxyethylene group and oxypropylene group, and the monomer (B) is an aromatic compound having a carboxyl group; and a method of dispersing a cement in a hydraulic composition, comprising mixing a polymer, which is obtained by co-condensating monomers comprising or consisting essentially of monomer (A), monomer (B) and monomer (C) with formaldehyde, or a salt obtained by neutralizing the polymer, with cement, wherein the monomer (A) is an aromatic compound having, on the average, 1 to 300 mol per molecule of at least one member selected from the group consisting of oxyethylene group and oxypropylene group, the monomer (B) is an aromatic compound having a carboxyl group and the monomer (C) is an aromatic compound having a sulfonic acid group.

The polymer or the salt obtained by neutralizing the polymer (hereinafter abbreviated to "the neutralized salt thereof") to be used as a cement dispersant in the present invention is a co-condensate of an aromatic compound having a (poly)oxyalkylene group and a carboxyl group with formaldehyde. Such a co-condensate is characterized in that it has a higher adsorptivity to cement particles, as compared with that of a cement dispersant comprising a conventional aromatic monomer unit.

Further, it becomes possible to retain more adequately the fluidity of a hydraulic composition containing the above co-condensate and water by selecting a suitable ratio of sulfonic acid groups to carboxyl groups in the co-condensate. That is, carboxyl groups each having a large adsorbing rate (i.e., speed) act effectively in the adsorption of the cement dispersant to cement particles at the beginning of dispersing cement in water, while sulfonic acid groups each having a small adsorbing rate act effectively in the adsorption of the cement dispersant to cement particles after the lapse of a definite time therefrom. Thus, different functional groups in the above-described co-condensate used as a cement dispersant are adsorbed to cement particles at different times, and, as a result, the fluidity of a hydraulic composition containing the co-condensate described above and water is retained for a definite time. Accordingly, by suitably selecting the ratio of sulfonic acid groups to carboxyl groups, various co-condensates each attaining a fluidity-retaining time required for a hydraulic composition containing the co-condensate and water can be provided.

In a co-condensate of an aromatic compound having a (poly)oxyalkylene group with formaldehyde as the co-condensate of the present invention, dispersing actions by sterically hindering repulsions of the (poly)oxyalkylene groups can be obtained as well, in addition to dispersing actions by electric repulsions that the aromatic monomer units inherently have. Accordingly, the use of the co-condensate of the present invention can achieve an extremely enhanced cement dispersing effect.

Further, the scope and applicability of the present invention will become apparent from the detailed description and examples given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and examples.

DETAILED DESCRIPTION OF THE INVENTION

Monomer (A) in the present invention is an aromatic compound having, on the average, 1 to 300 mol per molecule of at least one member selected from the group consisting of oxyethylene group ($-CH_2-CH_2O-$) and an oxypropylene group [$-CH(CH_3)-CH_2O-$ and/or $-CH_2-CH(CH_3)O-$]. Such an aromatic compound may be a single compound but is usually a mixture of compounds in which the numbers of an oxyalkylene group(s) having 2 to 3 carbon atoms (i.e., oxyethylene group and/or oxypropylene group) in the compounds are different from one another and the chemical structures at the moieties other than the above oxyalkylene group(s) are the same. That is, the aromatic compound (A) may be a produced mixture prepared by adding an alkylene oxide(s) having 2 to 3 carbon atoms to a starting aromatic compound. The average number of an oxyalkylene group(s) having 2 to 3 carbon atoms, per molecule, contained in the compounds constituting such a mixture is from 1 to 300, preferably from 2 to 280 and still more preferably from 10 to 200. Accordingly, the above mixture constituting monomer (A) may contain a compound having an oxyalkylene group number of less than 1 (zero, specially) and another compound having that exceeding 300 (at least 301, specially), as long as the average number of the oxyalkylene group(s) having 2 to 3 carbon atoms per molecule is from 1 to 300. When a co-condensation is effected with a compound or mixture having, on the average, 1 to 300 mol per molecule of an oxyalkylene group(s) having 2 to 3 carbon atoms, the resulting co-condensate (polymer or the neutralized salt thereof) has a high dispersing property for cement.

Examples of monomer (A) include (poly)oxyalkylene ($C_2$ and/or 3) (1 to 300) alkylphenols, i.e., adducts of alkylphenols with 1 to 300 moles of an alkylene oxide ($C_2$ and/or 3), and (poly)oxyalkylene ($C_2$ and/or 3) (1 to 300) alkylnaphthols, i.e., adducts of alkylnaphthols with 1 to 300 moles of an alkylene oxide ($C_2$ and/or 3). Specific examples of monomer (A) include adducts of phenol, cresol, nonylphenol, naphthol, methylnaphthol, butylnaphthol and bisphenol A with 1 to 300 moles of an alkylene oxide ($C_2$ and/or 3). From the viewpoint of ease of condensation with formaldehyde, monomer (A) is preferably an adduct of a benzene derivative, for example, phenol which may have an alkyl group, particularly phenol, with an alkylene oxide. The starting compound (a compound before adding an alkylene oxide) for monomer (A) itself may have an oxyalkylene group having 2 to 3 carbon atoms in some cases, and, in such case, the total of the number of such an oxyalkylene group of the starting compound and that of an oxyalkylene group having 2 to 3 carbon atoms introduced into the starting compound by an addition reaction is from 1 to 300 per molecule.

The compounds to be used for introducing a (poly)oxyalkylene group into the starting compound for monomer (A) are ethylene oxide and propylene oxide. The addition may be either a random addition or a block addition. The terminal portion of a (poly)oxyalkylene group of monomer (A) is not restricted to a hydroxyl group and may form an alkyl ether or a carboxylic acid ester, as long as the condensation reaction with formaldehyde is possible.

Monomer (B) in the present invention is an aromatic compound having a carboxyl group. Examples thereof include naphthalene derivatives and benzene ring derivatives, more specially, isophthalic acid, hydroxynaphthoic acid, benzoic acid and hydroxybenzoic acid, and isomers of these compounds, and their water-soluble salts.

From the viewpoint of ease of condensation with formaldehyde, monomer (B) is preferably a compound represented by the following formula (a):

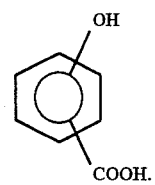

(a)

That is, at least one member selected from the group consisting of o-hydroxybenzoic acid, m-hydroxy-benzoic acid and p-hydroxybenzoic acid is(are) preferably used as monomer (B).

Monomer (C) in the present invention is an aromatic compound having a sulfonic acid group. Examples thereof include alkylnaphthalenesulfonic acids, alkylphenolsulfonic acids, anilinesulfonic acid and alkylbenzenesulfonic acids, specially, naphthalenesulfonic acid, methylnaphthalenesulfonic acid, butylnaphthalenesulfonic acid, ligninsulfonic acid, phenolsulfonic acid, cresolsulfonic acid, anilinesulfonic acid, benzenesulfonic acid and toluenesulfonic acid, and isomers of these compounds.

From the viewpoint of ease of condensation with formaldehyde, monomer (C) is preferably a phenol derivative having a sulfonic acid group, for example, phenolsulfonic acid which may have an alkyl group, and particularly preferably phenolsulfonic acid.

In the production of the polymer or the neutralized salt thereof (i.e., a co-condensate) according to the present invention, there can also be used, as a raw material therefor, a compound prepared by preliminarily condensing monomer (C) with formaldehyde, for example, a ligninsulfonic acid/formaldehyde condensate and a naphthalenesulfonic acid/formaldehyde condensate. Even when such a raw material is used, a compound corresponding to monomer (C) is an aromatic compound having a sulfonic acid used for preparing the condensate described above, for example, ligninsulfonic acid or naphthalenesulfonic acid.

In the production of the polymer or the neutralized salt thereof (i.e., a co-condensate) according to the present invention, as an additional starting compound other than formaldehyde and monomers (A), (B) and (C), one capable of being condensed with formaldehyde may be used in addition to monomers (A) and (B) or monomers (A), (B) and (C). The amount thereof is restricted within a range in which the co-condensate prepared by using such an additional compound can exhibit the effects of the present invention. Examples of such a compound include aromatic compounds such as phenol and alkylphenols, e.g., cresol.

The polymer obtained by condensing the monomers described above with formaldehyde can be used as a cement dispersant as it is, i.e., in a form of an acid. However, from the viewpoint of the storage and use thereof, the neutralized salt of the above polymer is preferred. Examples of the neutralized salt of the above polymer include monovalent metal salts (alkaline metal salts), divalent metal salts (alkaline earth metal salts), ammonium salt, amine salts and substituted amine salts (such as alkylamine salts having 1 to 3 carbon atoms, monoethanolamine salt, diethanolamine salt and triethanolamine salt) of the polymer.

In the production of the polymer obtained by co-condensing monomers (A) and (B) with formaldehyde or the neutralized salt thereof according to the present invention, the co-condensate which is prepared by using monomers (A) and (B) in such amounts that the monomer (A) is from 1 to 99 mol per 100 mol of the sum total of monomers (A) and (B) is suitable for retaining the dispersibility of cement during the period of up to about 30 minutes after mixing the cement with water. The co-condensate which is prepared by using monomers (A) and (B) in such amounts that the monomer (A) is from 10 to 50 mol of the sum (100 mol) of the total monomers (A) and (B) is particularly excellent in the dispersibility of the cement at the early stage and the dispersibility of the cement after the lapse of 30 minutes from mixing the cement with water (i.e., the dispersibility-retaining performance). Accordingly, a hydraulic composition comprising cement, water and the co-condensate described above has a desired fluidity even when the co-condensate is used in a small amount.

In the production of the polymer obtained by co-condensing monomers (A), (B) and (C) with formaldehyde or the neutralized salt thereof according to the present invention, the co-condensate which is prepared by using monomers (A), (B) and (C) in such amounts that each of the monomers (A), (B) and (C) is from 1 to 98 mol per 100 mol of the sum total of the monomers (A), (B) and (C) is suitable for retaining the dispersibility of cement during the period of up to about 60 minutes after mixing the cement with water. The co-condensate which is prepared by using monomers (A), (B) and (C) in such amounts that the monomer (A) is from 10 to 50 mol and the monomers (B) and (C) are each from 5 to 90 mol of the sum (100 mol) of the total monomers (A), (B) and (C) is particularly excellent in the dispersibility of the cement after the lapse of 60 minutes from mixing the cement with water (i.e., the dispersibility-retaining performance).

A standard production method for the co-condensate according to the present invention will be shown hereinafter, though the present invention will not be restricted thereby.

One example of the production methods for the neutralized salt of the polymer according to the present invention includes a method wherein monomers (A) and (B) or monomers (A), (B) and (C), each in a predetermined amount, are fed into a reaction vessel, a predetermined amount of formalin (a 37% formaldehyde solution) is dropwise added thereto at a temperature of 70° to 90° C. over 1 to 4 hours while stirring, the mixture obtained after the completion of the dropwise addition is refluxed for 3 to 30 hours while stirring and then the resultant reaction liquid is cooled and neutralized.

Water is preferably added to the reaction system in order to control the viscosity of the co-condensate and the condensation time. The co-condensation is carried out under acidic conditions. In the case where the reaction mixture is acidic due to the presence of an aromatic compound having a sulfonic acid and an unreacted acid contained therein as a contaminant, the co-condensation is carried out under the existing acidic condition without adding an additional acid to the reaction system. In the case where the reaction mixture is not acidic, sulfuric acid or the like is preliminarily added to the reaction system to adjust the pH of the reaction system to 2 or less, and the reaction is then carried out.

The co-condensate (the polymer or the neutralized salt thereof) of the present invention preferably has a weight-average molecular weight (by gel permeation chromatography, standard reference material: sodium polystyrenesulfonate) of 3,000 to 100,000, still more preferably 5,000 to 50,000. A co-condensate having a weight-average molecular weight falling within a range of from 3,000 to 100,000 shows an excellent dispersibility of cement.

The hydraulic composition according to the present invention comprises the above-described co-condensate (the cement dispersant) of the present invention and cement.

The cement dispersant of the present invention is used preferably in an amount of from 0.05 to 3.0% by weight, still more preferably in an amount of from 0.1 to 1.0% by weight, based on the weight of the cement.

The hydraulic composition according to the present invention may contain only cement as the hydraulic powder, and preferred as well is the hydraulic composition containing a fine powder having a fineness (see JIS R-5201), as measured by specific surface area, of 3,000 cm$^2$/g or more in addition to the cement. Examples of the fine powder having a fineness of 3,000 cm$^2$/g or more include blast furnace slag, fly ash, silica hume and stone powder. In consideration of the cost and the stability in supply, blast furnace slag, fly ash, and stone powder are preferred. From the viewpoint of the separate resistance (i.e., resistance against the separation of gravel from cement mortar) of a freshly mixed concrete, a fine powder having a large specific surface area, i.e., a large fineness, is preferable. For example, in case of blast furnace slag, the fineness thereof is preferably 5,000 to 10,000 cm$^2$/g. When a fine powder having a small fineness is used, an increased blend amount of the fine powder causes a freshly mixed concrete to show a desired separate resistance.

The hydraulic composition according to the present invention may also contain a conventional dispersant(s) in addition to the cement dispersant of the present invention. Such a conventional dispersant to be used in the hydraulic composition according to the present invention may be any of dispersants which are generally used as dispersants for concrete. Preferred examples of such conventional dispersants include those hitherto known as high performance water reducing agents, for example, a naphthalenesulfonic acid salt/formaldehyde condensate, a melaminesulfonic acid salt/formaldehyde condensate, a polycarboxylic acid and the esters thereof and the salts thereof, a refined ligninsulfonic acid and the salts thereof, a polystyrenesulfonate, a cement dispersant having phenol moieties, such as co-condensates of formaldehyde with phenolsulfonic acid and another monomer(s) capable of being condensed with formaldehyde, and an aniline-sulfonic acid cement dispersant, such as co-condensates of formaldehyde with anilinesulfonic acid and another monomer(s) capable of being condensed with formaldehyde.

The conventional dispersant described above is used suitably in an amount of from 5 to 95% by weight, based on the weight of the cement dispersant of the present invention.

The hydraulic composition according to the present invention may further contain conventional known additives for cement. Examples of such additives include air entraining (AE) agents, AE water reducing agents, fluidizing agents, high performance water reducing agents, retardants, early high-strengthening agents, accelerators, foaming agents, blowing agents, water-holding agents, thickeners, water-proofing agents, defoaming agents, other water soluble polymers and other surfactants.

The hydraulic composition of the present invention is usually used in the fields of civil engineering and construction and for secondary products.

Further, the present invention also relates to a use of the cement dispersant of the present invention for mixing it with cement, and a method of dispersing a cement in a hydraulic composition, comprising mixing a polymer or a neutralized salt of the polymer, i.e., the cement dispersant of the present invention, with cement.

In mixing the cement dispersant with cement, the cement dispersant may be in the form of an aqueous solution thereof or a powder as it is. The mixing of the cement dispersant with cement is carried out by any suitable method, for example, (1) dry-blending of the cement dispersant with cement, (2) mixing of water to be used for kneading and containing the cement dispersant with cement, (3) addition of the cement dispersant to a hydraulic composition containing water during kneading the hydraulic composition, i.e., at the same time as pouring water into cement or during the period of from immediately after pouring water into cement to the completion of the kneading of the hydraulic composition, and mixing therewith, and (4) addition of the cement dispersant to a hydraulic composition containing water which has once been kneaded, and mixing therewith. The cement dispersant may be added all at once or in several separate portions.

In mixing the cement dispersant of the present invention with cement, a conventional dispersant may also be used. In this case, the conventional dispersant, e.g., liqninsulfonic acid or a salt thereof, a hydroxycarboxylic acid or a salt thereof, a polycarboxylic acid or a salt thereof, or a polyalkylcarboxylic anhydride or a salt thereof, may be preliminarily mixed with the cement dispersant of the present invention; either the conventional dispersant or the cement dispersant of the present invention is added to cement and optionally mixed with the cement, and then the other dispersant is added to the resultant mixture and mixed therewith; or, alternatively, either the conventional dispersant or the cement dispersant of the present invention is added to a hydraulic composition containing water, the mixture thus obtained is optionally kneaded, and then the other dispersant is added thereto.

Further, in mixing the cement dispersant of the present invention with cement, an additive for cement other than the above cement dispersant and/or an auxiliary material for cement, for example, a controlled releasing dispersant, an AE water reducing agent, a fluidizing agent, a high performance water reducing agent, a retardant, an early high-strengthening agent, an accelerator, a foaming agent, a blowing agent, a defoaming agent, a water-holding agent, a thickener, a self-leveling agent, a water-proofing agent, a rust preventive, a colorant, a fungicide, a crack reducing agent, a polymeric emulsion, another surfactant, another water soluble polymer, an expanding agent, an expanding material, or glass fiber, may also be used. These additives and auxiliary materials may be used either singly or in combination of two or more of them.

When a hydraulic composition containing water is prepared with the cement dispersant of the present invention, slump loss does not occur for a long period of time. Therefore, no trouble due to the reduction of the fluidity of the hydraulic composition during transportation is caused; and force feeding of the hydraulic composition with a pump can therefore be carried out after a lapse of some time from preparing the hydraulic composition.

Since the hydraulic composition comprising the cement dispersant of the present invention and water exhibits an excellent fluidity, a filling work of the above hydraulic composition into a formwork is facilitated. Further, since the cement dispersant of the present invention also exhibits an excellent water reducing effect, the cement dispersant is expected to be applicable to a high strength concrete.

EXAMPLES

The present invention will now be described in more detail by referring to the following Examples, though the scope of the present invention is not limited by them.

In the following Examples and Production Examples, every percentage is given by weight unless otherwise specified.

Further, in the following Examples and Production Examples, the molecular weight is a weight-average molecular weight which is determined by gel permeation chromatography using sodium polystyrenesulfonate as a standard reference material.

I. Monomers (A), (B) and (C) used in Production Examples

The monomers (A), (B) and (C) used in Production Examples will now be described.

In monomers (A), EO and PO represent ethylene oxide which is used for adding oxyethylene groups to the starting compounds for monomers (A) and propylene oxide which is used for adding oxypropylene groups to the starting compounds for monomers (A), respectively. The numerals in the parentheses each represents an average number of EO or PO molecules added per molecule of the starting compound.

Monomers (A)

A-1: adduct of phenol with EO (10),
A-2: adduct of phenol with EO (25),
A-3: adduct of phenol with EO (75),
A-4: adduct of phenol with EO (120),
A-5: block adduct of phenol with EO (250) and PO (20),
A-6: adduct of naphthol with EO (2), and
A-7 (for Comparative Production Example): adduct of phenol with EO (370).

Monomers (B)

B-1: p-hydroxybenzoic acid,
B-2: o-hydroxybenzoic acid, and
B-3: hydroxynaphthoic acid.

Monomers (C)

C-1: phenolsulfonic acid,
C-2: p-cresolsulfonic acid, and
C-3: naphthalenesulfonic acid.

II. Production Examples

Production Example 1

Production of cement dispersant D-1

0.3 mol of A-1, 0.7 mol of B-1, 0.5 mol of sulfuric acid and 4 mol of water were fed into a reactor and stirred. For adding 0.9 mol of formaldehyde to the resulting mixture, a 37% solution of formaldehyde was dropwise added thereto at 80° C. over 3 hours. After the completion of the dropwise addition, the mixture thus obtained was heated to 105° C., and then maintained at that temperature for 10 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained divided into two layers after standing. The lower layer was removed therefrom, thus obtaining a liquid containing the desired co-condensate (a sodium salt, cement dispersant D-1) which constituted the upper layer. 5 g of the liquid was taken and heated at 105° C. for 4 hours to evaporate water, and then the weight of the residue was determined. From the weight thereof, the solids content of the liquid was calculated. Water was added to the rest of the liquid to thereby adjust the solids (i.e., the co-condensate) content to 30% by weight. The molecular weight of the co-condensate was determined as 21,000.

Production Example 2

Production of cement dispersant D-2

0.2 mol of A-3, 0.7 mol of B-1, 0.1 mol of B-2, 0.5 mol of sulfuric acid and 5 mol of water were fed into a reactor and stirred. For adding 0.9 mol of formaldehyde to the resulting mixture, a 37% solution of formaldehyde was dropwise added thereto at 80° C. for 3 hours. After the completion of the dropwise addition, the mixture thus obtained was heated to 105° C., and then maintained at that temperature for 12 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1. Thus, a liquid having a solids [i.e., the desired co-condensate (a sodium salt, cement dispersant D-2)] content of 30% by weight was obtained. The molecular weight of the co-condensate was determined as 19,000.

Production Example 3

Production of cement dispersant D-3

0.1 mol of A-4, 0.9 mol of B-1, 0.5 mol of sulfuric acid and 4 mol of water were fed into a reactor and stirred. For adding 0.9 mol of formaldehyde to the resulting mixture, a 37% solution of formaldehyde was dropwise added thereto at 80° C. over 3 hours. After the completion of the dropwise addition, the mixture thus obtained was heated to 105° C., and then maintained at that temperature for 10 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1. Thus, a liquid having a solids [i.e., the desired co-condensate (a sodium salt, cement dispersant D-3)] content of 30% by weight was obtained. The molecular weight of the co-condensate was determined as 42,000.

Production Example 4

Production of cement dispersant D-4

0.3 mol of A-1, 0.6 mol of B-1, 0.1 mol of C-1, 0.3 mol of sulfuric acid and 4 mol of water were fed into a reactor and stirred. For adding 0.9 mol of formaldehyde to the resulting mixture, a 37% solution of formaldehyde was dropwise added thereto at 80° C. over 3 hours. After the completion of the dropwise addition, the mixture thus obtained was heated to 105° C., and then maintained at that temperature for 10 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1. Thus, a liquid having a solids [i.e., the desired co-condensate (a sodium salt, cement dispersant D-4)] content of 30% by weight was obtained. The molecular weight of the co-condensate was determined as 12,000.

Production Example 5

Production of cement dispersant D-5

0.3 mol of A-2, 0.6 mol of B-1, 0.1 mol of C-2 and 5 mol of water were fed into a reactor and stirred. For adding 0.9 mol of formaldehyde to the resulting mixture, a 37% solution of formaldehyde was dropwise added thereto at 80° C.

over 3 hours. After the completion of the dropwise addition, the mixture thus obtained was heated to 105° C., and then maintained at that temperature for 12 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1. Thus, a liquid having a solids [i.e., the desired co-condensate (a sodium salt, cement dispersant D-5)] content of 30% by weight was obtained. The molecular weight of the co-condensate was determined as 17,000.

Production Example 6

Production of cement dispersant D-6

C-3 was condensed with formaldehyde to thereby prepare a naphthalenesulfonic acid/formaldehyde condensate having an average molecular weight of 4,500. 0.2 mol of A-3, 0.7 mol of B-1, 0.1 mol (calculated as the molar amount of C-3) of the above-mentioned naphthalenesulfonic acid/formaldehyde condensate and 5 mol of water were fed into a reactor and stirred. For adding 0.9 mol (including the formaldehyde derived from the above-mentioned naphthalenesulfonic acid/formaldehyde condensate) of formaldehyde to the resulting mixture, a 37% solution of formaldehyde was dropwise added thereto at 80° C. over 3 hours. After the completion of the dropwise addition, the mixture thus obtained was heated to 105° C., and then maintained at that temperature for 8 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solids [i.e., the desired co-condensate (a sodium salt, cement dispersant D-6)] content of 20% by weight was obtained. The molecular weight of the co-condensate was determined as 25,000.

Production Example 7

Production of cement dispersant D-7

0.2 mol of A-4, 0.5 mol of B-2, 0.3 mol of C-1 and 5 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 12 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solids [i.e., the desired co-condensate (a sodium salt, cement dispersant D-7)] content of 20% by weight was obtained. The molecular weight of the co-condensate was determined as 31,000.

Production Example 8

Production of cement dispersant D-8

0.1 mol of A-5, 0.5 mol of B-2, 0.4 mol of C-1 and 6 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 15 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solids [i.e., the desired co-condensate (a sodium salt, cement dispersant D-8)] content of 20% by weight was obtained. The molecular weight of the co-condensate was determined as 33,000.

Production Example 9

Production of cement dispersant D-9

0.3 mol of A-6, 0.3 mol of B-2, 0.4 mol of C-1 and 6 mol of water were fed into a reactor and stirred. For adding 0.9 g mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 25 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solid [i.e., the desired co-condensate (a sodium salt, cement dispersant D-9)] content of 20% by weight was obtained. The molecular weight of the co-condensate was determined as 11,000.

Production Example 10

Production of cement dispersant D-10

0.1 mol of A-4, 0.6 mol of B-2, 0.3 mol of C-1 and 6 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 18 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solid [i.e., the desired co-condensate (a sodium salt, cement dispersant D-10)] content of 20% by weight was obtained. The molecular weight of the co-condensate was determined as 26,000.

Production Example 11

Production of cement dispersant D-11

0.1 mol of A-3, 0.1 mol of B-3, 0.6 mol of C-1 and 3 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 25 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1. Thus, a liquid having a solids [i.e., the desired co-condensate (a sodium salt, cement dispersant D-11)] content of 30% by weight was obtained. The molecular weight of the co-condensate was determined as 11,000.

Production Example 12

Production of cement dispersant D-12

0.3 mol of A-1, 0.6 mol of B-1, 0.1 mol of C-1, 0.3 mol of sulfuric acid and 4 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 10 hours to effect a reaction. Then, the reaction mixture was cooled to 50° C. The mixture thus obtained divided into two layers after standing. The lower layer was removed therefrom, thus obtaining a liquid containing the desired co-condensate (acid type, cement dispersant D-12) which constituted the upper layer. 5 g of the liquid was taken and heated at 105° C. for 4 hours to evaporate water, and then the weight of the residue was determined. From the weight thereof, the solids content of the liquid was calculated. Water was added to the rest of the liquid to thereby adjust the solids (i.e., the co-condensate) content to 35% by weight. The molecular weight of the co-condensate was determined as 11,500.

Production Example 13

Production of cement dispersant D-13 (Comparative product 0.1 mol of A-7, 0.5 mol of B-2, 0.4 mol of C-1 and 7 mol of water were fed into a reactor and stirred. For adding 0.9 mol of formaldehyde to the resulting mixture, 37% solution of formaldehyde was dropwise added thereto at 80° C. over 3 hours. After the completion of the dropwise addition, the mixture thus obtained was heated to 105° C., and then maintained at that temperature for 15 hours to effect a reaction. Then, the reaction mixture was cooled to 50° C. A 50% aqueous solution of sodium hydroxide was added to the reaction mixture sufficient to adjust the pH thereof to 8, thus neutralizing the reaction product. The mixture thus obtained was treated in the same manner as that in Production Example 1, except that water was added to the mixture to thereby adjust the solids content thereof to 20% by weight. Thus, a liquid having a solids [i.e., the desired co-condensate (a sodium salt, cement dispersant D-13)] content of 20% by weight was obtained. The molecular weight of the co-condensate was determined as 41,000.

III. Details of conventional cement dispersants which were used as Comparative products NS: an admixture comprising a salt of naphthalene-sulfonic acid/formaldehyde condensate (Mighty 150, a product of Kao Corporation), and MS: an admixture comprising a salt of melamine-sulfonic acid/formaldehyde condensate (Mighty 150V-2, a product of Kao Corporation).

IV. Evaluation of cement dispersants

Materials for concrete were prepared according to the conditions specified in Table 1. The materials were mixed with a cement dispersant described above in a tilting mixer at 25 rpm for 3 minutes to prepare a concrete composition (i.e., a freshly mixed concrete). In order to evaluate the fluidity of the concrete composition, the slump value thereof was determined according to the method stipulated in JIS A 1101. The slump value thus determined was taken as the initial one. Then, the mixer was rotated at 4 rpm for 30 minutes and, after stopping the rotation, the concrete composition was examined for slump value in the same manner as that described above. Thus, the slump value after 30 minutes was determined. Further, after the 60-minute rotation of the mixer under the same condition as that used above, the concrete composition was also examined for slump value. Thus, the slump value after 60 minutes was determined.

Each cement dispersant was added in such an amount as to give an initial slump value of 20±1 cm.

The results are given in Table 2.

As is clear from the results given in the Table 2, the cement dispersant of the present invention can impart fluidity to a concrete composition even when used in a reduced amount as compared with that of the comparative products. Further, the concrete composition containing the cement dispersant of the present invention maintains a good slump value with the lapse of time, while the slump value of a concrete composition containing a comparative product lowers to about 10, after about 60 minutes from the completion of the mixing of the materials. This means that such a freshly mixed concrete with only conventional dispersants will have been hardened before being placed. Such a concrete cannot be placed.

As described above, it is clear that the cement dispersant of the present invention exhibits an excellent water-reducing effect and a remarkable effect of the prevention of slump loss.

TABLE 1

| Formulation of concrete and materials used | | | | | |
|---|---|---|---|---|---|
| W/C | s/a | Unit amt. (kg/m³) | | | |
| (%) | (%) | C | W | S | G |
| 55.0 | 47.6 | 336 | 185 | 799 | 974 |

Materials used
W: tap water
C: Chuo normal Portland cement (a product of Onoda Cement Co., Ltd.), specific gravity: 3.16
S: river sand from the Kino river, specific gravity: 2.56
G: crushed stone from Takarazuka, specific gravity: 2.60
s/a: sand/sand + gravel (S/S + G) (volume ratio)

TABLE 2

| Type of cement dispersant | | Amt. of cement dispersant added*1 (% of wt.) | Slump value (cm) | | |
|---|---|---|---|---|---|
| | | | initial | after 30 min | after 60 min |
| Invention product | D-1 | 0.14 | 20.5 | 20.0 | 15.0 |
| | D-2 | 0.16 | 20.0 | 20.0 | 14.5 |
| | D-3 | 0.17 | 20.0 | 19.5 | 14.5 |
| | D-4 | 0.16 | 20.5 | 20.0 | 18.5 |
| | D-5 | 0.25 | 20.0 | 19.5 | 19.5 |

TABLE 2-continued

| Type of cement dispersant | Amt. of cement dispersant added*1 (% of wt.) | Slump value (cm) | | |
|---|---|---|---|---|
| | | initial | after 30 min | after 60 min |
| D-6 | 0.23 | 20.0 | 19.5 | 19.0 |
| D-7 | 0.15 | 20.5 | 19.5 | 18.5 |
| D-8 | 0.27 | 20.5 | 19.0 | 17.5 |
| D-9 | 0.30 | 20.5 | 19.5 | 17.0 |
| D-10 | 0.15 | 20.0 | 19.0 | 18.0 |
| D-11 | 0.33 | 20.0 | 19.0 | 16.0 |
| D-12 | 0.18 | 20.0 | 19.5 | 18.0 |
| Comp. product D-13 | 0.40 | 20.0 | 13.0 | 9.5 |
| NS | 0.55 | 20.5 | 14.0 | 10.0 |
| MS | 0.62 | 20.0 | 13.5 | 9.0 |

*1 amount of solid matter, i.e., co-condensate, based on the weight of the cement The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A cement dispersant comprising (a) a polymer which is obtained by co-condensating monomer (A) and monomer (B) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group, and the monomer (B) is an aromatic compound having a carboxyl group.

2. The cement dispersant according to claim 1, wherein the monomer (A) is used in an amount of from 1 to 99 mol per 100 mol of the sum total of the monomer (A) and the monomer (B).

3. The cement dispersant according to claim 1, wherein the monomer (A) is a benzene derivative.

4. The cement dispersant according to claim 3, wherein the benzene derivative is a compound obtained by reacting at least one member selected from the group consisting of ethylene oxide and propylene oxide with phenol.

5. The cement dispersant according to claim 1, wherein the monomer (B) is a naphthalene derivative or a benzene derivative.

6. The cement dispersant according to claim 5, wherein the benzene derivative is a compound represented by the formula (a):

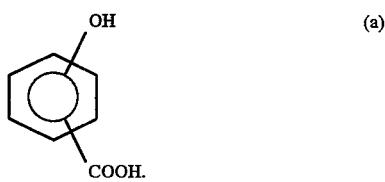

7. The cement dispersant according to claim 1, wherein the salt obtained by neutralizing the polymer is a monovalent metal, divalent metal, ammonium, amine or substituted amine salt of the polymer.

8. The cement dispersant according to claim 1, wherein the polymer or the salt obtained by neutralizing the polymer has an average molecular weight of 3,000 to 1,000,000.

9. A cement dispersant comprising (a) a polymer which is obtained by co-condensating monomer (A), monomer (B) and monomer (C) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group, the monomer (B) is an aromatic compound having a carboxyl group and the monomer (C) is an aromatic compound having a sulfonic acid group.

10. The cement dispersant according to claim 9, wherein the monomer (A), the monomer (B) and the monomer (C) are each used in an amount of from 1 to 98 mol per 100 mol of the sum total of the monomer (A), monomer (B) and the monomer (C).

11. The cement dispersant according to claim 9, wherein the monomer (A) is a benzene derivative.

12. The cement dispersant according to claim 11, wherein the benzene derivative is a compound obtained by reacting at least one member selected from the group consisting of ethylene oxide and propylene oxide with phenol.

13. The cement dispersant according to claim 9, wherein the monomer (B) is a naphthalene derivative or a benzene derivative.

14. The cement dispersant according to claim 13, wherein the benzene derivative is a compound represented by the formula (a):

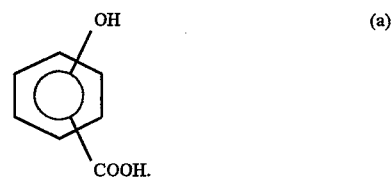

15. The cement dispersant according to claim 9, wherein the monomer (C) is a phenol derivative.

16. The cement dispersant according to claim 15, wherein the phenol derivative is phenolsulfonic acid.

17. The cement dispersant according to claim 9, wherein the salt obtained by neutralizing the polymer is a monovalent metal, divalent metal, ammonium, amine or substituted amine salt of the polymer.

18. The cement dispersant according to claim 9, wherein the polymer or the salt obtained by neutralizing the polymer has an average molecular weight of 3,000 to 1,000,000.

19. A hydraulic composition comprising cement and either (a) a polymer which is obtained by co-condensating monomers comprising monomer (A) and monomer (B) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group and the monomer (B) is an aromatic compound having a carboxyl group.

20. The hydraulic composition according to claim 19, wherein the polymer or the salt obtained by neutralizing the polymer is present in an amount of 0.05 to 3.0% by weight based on the weight of the cement.

21. A hydraulic composition comprising cement and either (a) a polymer which is obtained by co-condensating monomers comprising monomer (A), monomer (B) and monomer (C) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group, the monomer (B) is an aromatic compound having a carboxyl group and the monomer (C) is an aromatic compound having a sulfonic acid group.

22. The hydraulic composition according to claim 21, wherein the polymer or the salt obtained by neutralizing the polymer is present in an amount of 0.05 to 3.0% by weight based on the weight of the cement.

23. A method of dispersing a cement in a hydraulic composition, comprising mixing, with cement either (a) a polymer, which is obtained by co-condensating monomers comprising monomer (A) and monomer (B) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group, and the monomer (B) is an aromatic compound having a carboxyl group.

24. A method of dispersing a cement in a hydraulic composition, comprising mixing, with cement either (a) a polymer, which is obtained by co-condensating monomers comprising monomer (A), monomer (B) and monomer (C) with formaldehyde, or (b) a salt obtained by neutralizing the polymer, wherein the monomer (A) is an aromatic compound having, on the average, 1 to 300 mol per molecule of at least one member selected from the group consisting of oxyethylene group and oxypropylene group, the monomer (B) is an aromatic compound having a carboxyl group and the monomer (C) is an aromatic compound having a sulfonic acid group.

* * * * *